(12) United States Patent
Keller et al.

(10) Patent No.: US 8,792,852 B2
(45) Date of Patent: Jul. 29, 2014

(54) METHOD FOR INFORMING MULTIPLE MOBILE TERMINALS OF AN EMERGENCY EVENT

(75) Inventors: Ralf Keller, Würselen (DE); Frank Hundscheidt, Kerkrade (NL); Thorsten Lohmar, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 862 days.

(21) Appl. No.: 11/721,669

(22) PCT Filed: Dec. 23, 2004

(86) PCT No.: PCT/EP2004/053701
§ 371 (c)(1),
(2), (4) Date: Aug. 3, 2007

(87) PCT Pub. No.: WO2006/066629
PCT Pub. Date: Jun. 29, 2006

(65) Prior Publication Data
US 2008/0261554 A1    Oct. 23, 2008

(51) Int. Cl.
*H04M 11/04* (2006.01)
*H04B 7/00* (2006.01)
*H04M 3/42* (2006.01)
*H04L 29/06* (2006.01)
*H04L 12/42* (2006.01)
*G08B 1/08* (2006.01)
*H04Q 1/30* (2006.01)

(52) U.S. Cl.
USPC .............. 455/404.1; 455/521; 455/414.1; 455/414.3; 370/338; 370/455; 340/539.18; 340/7.48

(58) Field of Classification Search
USPC ............. 455/404.1, 521, 404, 414.1, 414.3; 340/338, 455, 539.18, 7.48; 370/338, 370/455
See application file for complete search history.

(56) References Cited

U.S. PATENT DOCUMENTS

| 6,329,904 | B1 * | 12/2001 | Lamb ................. 340/286.02 |
| 6,983,162 | B2 | 1/2006 | Garani et al. |
| 2002/0160745 | A1 * | 10/2002 | Wang ................. 455/404 |
| 2002/0176545 | A1 | 11/2002 | Schweitzer |
| 2004/0103158 | A1 | 5/2004 | Vella et al. |
| 2005/0083961 | A1 * | 4/2005 | Pecen et al. ............ 370/432 |

FOREIGN PATENT DOCUMENTS

| EP | 998075 | A2 | 5/2000 |
| EP | 1209886 | A2 | 5/2002 |
| JP | 2002-078005 | A | 3/2002 |
| JP | 2003-333105 | A | 5/2002 |
| WO | WO 03/043360 | A | 5/2003 |
| WO | WO 2004/006486 | A3 | 1/2004 |

OTHER PUBLICATIONS

Sidebottom, et al.: "Signaling System 7 (SS7) Message Transfer Part 3 (MTP3)—User Adaptation Layer (M3UA)". Network Working Group, Request for Comments: 3332. Sep. 2002.

* cited by examiner

*Primary Examiner* — Jinsong Hu
*Assistant Examiner* — Dung Hong (57) ABSTRACT

A method, devices, a system, and computer programs for informing multiple mobile terminals (UE10-90) of an emergency event are disclosed. The method comprises the steps of receiving (S300) emergency information associated with the emergency event, establishing (S400) an emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication being not associated with the emergency priority indicator, and delivering (S600) the emergency service via the emergency multimedia capable distribution bearer to the multiple mobile terminals (UE10-90).

28 Claims, 5 Drawing Sheets

METHOD FOR INFORMING MULTIPLE MOBILE TERMINALS OF AN EMERGENCY EVENT

FIELD OF THE INVENTION

The present invention relates to the area of security, especially to a method and devices for informing multiple mobile terminals of an emergency event.

BACKGROUND OF THE INVENTION

Alerting the public in case of an emergency event is legally mandated in many countries. Examples for emergency events are environmental disasters like earthquakes or thunderstorms or volcano eruptions, industrial catastrophes like nuclear or chemical plant explosions, or terrorist attacks or wars.

Traditionally, the public is informed on emergency events via FM-radio or television (TV). Accordingly, emergency information comprising e.g. information about the emergency event and security instructions is broadcasted via FM- or TV channels to radio or TV devices, respectively. However, those devices are typically stationary devices like a home TV or a home hifi-unit or quasi-stationary like a car radio, i.e. a drawback of such traditional emergency alert systems is that mobile users that typically do not carry such stationary or quasi-stationary devices can not be alerted immediately in emergency events.

Recently, in November 2001, a cell broadcast system was described by CMG Wireless Data Solutions, 2001 (Internet Publication© November 2001) to alert citizens via cell broadcast in case of an emergency event. The system basically consists of a call center and a mobile communication network. The call center can be called for informing the call center about an emergency event, e.g. via 112 emergency call, optionally supplemented with location information derived from the location of the calling mobile terminal to indicate to the call center the location of the emergency event. Based on that information, the call center can select a geographical area and can send short message service messages (SMSs) via cell broadcast to mobile phones in that particular geographical area to inform the corresponding users about the event.

SMS, however, is restricted to short text messages with max 160 characters. Such short text may be sufficient for an immediate warning about an emergency event, however the content and scope of information is very limited and the adaptation of often complex emergency information to such a short text message may cause time delays and misinterpretation at the sending and receiving end, both harmful in emergency situations.

Furthermore, the CMG system is susceptible to network congestion, i.e. emergency SMSs may not be delivered or may be delayed in case the mobile network is congested. Especially in emergency situations wherein people tend to call official agencies or relatives on a large scale, network congestion can be very problematic.

Moreover, on each mobile phone a cell broadcast reception setting has to be active to receive messages via cell broadcast service (CBS). However, users are often not aware of this feature and do not manually activate it or tend to manually deactivate this feature such that a large fraction of the mobile phones in a cell thus do not receive cell broadcast messages which makes current cell broadcast systems insecure for informing of an emergency event.

SUMMARY OF THE INVENTION

It is an object of the present invention to provide a method, devices, a system, and computer programs that overcome the aforementioned drawbacks.

The invention comprises a method that accomplishes an emergency service delivery to multiple mobile terminals for the purpose of improved information of an emergency event. The emergency service is associated with received emergency information.

The method comprises several steps that can be executed according to the following order although there may be a variation in order some of the steps or some of the steps may be performed simultaneously.

The method may start with receiving emergency information to be associated with the emergency service. For delivering the emergency service to the multiple mobile terminals, an emergency multimedia capable distribution bearer is established. The emergency multimedia capable distribution bearer is associated with an emergency priority indicator. The emergency priority indicator indicates a higher priority for the emergency multimedia capable distribution bearer compared to further communication being not associated with the emergency priority indicator such that one or more communication network components can prioritize the emergency service delivery over the further communication when delivering the emergency service via the emergency multimedia capable distribution bearer to the multiple mobile terminals.

The invention provides many advantages compared to existing emergency alert systems. Any kind of emergency service in any kind of multimedia format can be delivered to the recipient mobile terminals, especially the emergency service is not restricted to short text only. Accordingly, cumbersome, error-prone, and time-consuming conversion of emergency information to short text is not needed thus saving valuable time, increasing information scope and content, and avoiding misinterpretations. All instances of the delivery chain may be adapted to prioritize the delivery of the emergency service via the emergency multimedia capable distribution bearer to the mobile terminals thus decreasing delivery time, reducing loss of data, improving quality of service, and lowering susceptibility to network congestion. Furthermore, the emergency service delivery via the emergency multimedia capable distribution bearer is open to many communication techniques and does not have to rely on the manual activation of reception settings at the respective mobile terminals. In the end, a fast, reliable, and secure distribution channel for informing mobile terminals about an emergency event in any kind of multimedia format with a high rate of informed mobile terminals is achieved.

According to a preferred embodiment, an entity from which the emergency information is received and/or an entity that requests the emergency service delivery for informing about the emergency event is authenticated to prevent misuse of the emergency multimedia capable distribution bearer and delivery of emergency services thereby by unauthorized entities. The requesting entity and the emergency information providing entity are typically one institution but separate implementations are also possible.

According to a further preferred embodiment, the emergency priority indicator can be selected from a group of emergency priority indicators each indicating an emergency priority level and the selected emergency priority indicator can be associated with the emergency multimedia capable distribution bearer such that the emergency service delivery to the multiple mobile terminals can be accomplished according to the emergency priority level of the selected emergency priority indicator. Selection criteria may be an identity of an entity that requests the emergency service delivery and/or an identity of an entity from that the emergency information is received. Further criteria may be an indication of a severeness and/or an urgency of the emergency event, and/or one or more identities associated with the mobile terminals to which the emergency service is to be delivered. Selecting an emergency indicator from a group of emergency indicators each indicating an emergency priority level and associating the selected emergency priority indicator thus provides larger flexibility by a differentiated prioritization within emergency service delivery.

According to a further preferred embodiment, the emergency priority indicator can be analyzed by at least one component of a communication network for the delivering of the emergency service and as a result of the analysis, the delivery of the emergency service via the emergency multimedia capable distribution bearer can be prioritized over further communication being not associated with the emergency priority indicator. Said prioritization may comprise interrupting, stopping, and/or decreasing a transmission power and/or a processing power associated with the further communication. Alternatively or preferably in addition, said prioritization may comprise activation and/or an increase of a transmission power and/or a processing power associated with the emergency service delivery via the emergency multimedia capable distribution bearer. Prioritization may further comprise a change of a scheduling of one or more messages associated with the emergency service delivery compared to a scheduling of one or more messages associated with the further communication such that the one or more messages associated with the emergency service delivery are processed and/or sent at an earlier time compared to the one or more messages associated with the further communication.

According to a further preferred embodiment, the emergency priority indicator is associated with an emergency Quality of Service (QoS) class of the emergency service delivery. Alternatively or in addition, a Temporary Mobile Group Identity (TMGI) may comprise the emergency priority indicator, e.g. one or more specific TMGIs numbers may be reserved for the emergency service delivery. A defined fraction of the TMGI bit pattern like a local MBMS bearer service identity may be reserved and defined for the emergency priority indicator.

According to further preferred embodiment, the multiple mobile terminals are set to an emergency alert mode for a clearly human-recognizable perception of the delivered emergency service, i.e. current settings of a mobile terminal can be changed by e.g. overwriting with emergency alert mode settings such that the emergency service can be presented to a user in a most perceptual way. By setting a mobile terminal to an emergency alert mode, the mobile terminal's output level may be tuned to highest possible level and some user-interaction possibilities may be at least temporarily constrained or even deactivated. An immediate reception and processing of the emergency service for an immediate and clearly noticeable presentation of the emergency service to the user is possible by the setting to the emergency alert mode. The setting to the emergency alert mode can occur most preferably automatically in a network-controlled, user-hidden and silent way as a background process on the mobile terminal without any user-interaction. All in all, setting the mobile terminals to an emergency alert mode for a clearly human-recognizable perception of the delivered emergency service increases in the end the number of informed users as an emergency service that is received by a mobile terminal can no longer be missed by the corresponding user just because of the mobile terminal's current settings, e.g. in case the current settings effect a muting of the output unit(s) of the mobile terminal the user may miss a received emergency service and is thus not informed of the emergency event.

According to a further preferred embodiment, an emergency alert mode activation indicator can be sent to the mobile terminals for an activation of the setting to the emergency alert mode. Alternatively or in addition, an emergency alert mode setting instruction can be sent to the mobile terminals for instructing the mobile terminals for the setting to the emergency alert mode. Using an emergency alert mode indicator being preferably standardized uses minimum messaging effort compared to an emergency alert mode setting instruction like a self-executable program file or Java-script. However, this advantage of less transferable data and minimized network load has to be balanced against the possibility that mobile terminals may exist that do not possess the capability to change their settings to the emergency alert mode according to said emergency activation indicator because the underlying settings are not available at such terminals or that those terminals are not capable of processing or recognizing such indicator which motivate for the sending of an emergency alert mode setting instruction for informing these kinds of mobile terminals.

According to a further preferred embodiment, the emergency priority indicator and the emergency alert mode activation indicator are one indicator, which can reduce the implementation and processing complexity as only one indicator for serving both purposes of emergency service delivery prioritization and emergency alert mode setting has to be defined and processed at the respective entities.

According to a further preferred embodiment, the multiple mobile terminals may be allocated to a group of mobile terminals and the emergency service is delivered to the group via the emergency multimedia capable distribution bearer. This group-wise treatment allows to provide group-specific emergency service to a group of mobile terminals thus increasing flexibility and security of the method as e.g. a group of mobile terminals associated to a group-type "firemen" may be provided with firemen-specific instructions related to the emergency event that are not intended to be delivered to public mobile terminals or further groups (to whom further group-specific emergency services may be delivered accordingly).

According to a preferred embodiment, the emergency multimedia capable distribution bearer is a bearer of a Multimedia Broadcast/Multicast Service (MBMS).

The present invention also concerns computer programs comprising portions of software codes in order to implement the method as described above when operated at a processing unit of a service center, a network component, or a mobile terminal. Such a computer program can be stored on a computer readable medium. The computer-readable medium can be a permanent or rewritable memory within the service center, the network component, or the mobile terminal or can be located externally. The respective computer program can be also transferred to the service center, the network component, or the mobile terminal for example via a cable or a wireless link as a sequence of signals.

A computer program operable at a processing unit of a service center comprises code adapted to process received emergency information associated with the emergency event and to initiate an establishing of an emergency multimedia capable distribution bearer for a delivery of an emergency service associated with the received emergency information, the emergency multimedia capable distribution bearer being associated with an emergency priority indicator indicating higher priority for the emergency multimedia capable distribution bearer compared to a bearer being not associated with the emergency priority indicator. The computer program further comprises code adapted to initiate at a transmission unit a sending of the emergency service via the emergency multimedia capable distribution bearer to the multiple mobile terminals.

The computer program may further comprise code adapted to perform at least one item from a group of associating the emergency priority indicator to the emergency multimedia capable distribution bearer, authenticating an entity from which the emergency information is received and/or an entity requesting the emergency service delivery, selecting the emergency priority indicator from a group of emergency priority indicators each indicating an emergency priority level and associating the selected emergency priority indicator as the emergency priority indicator with the emergency multimedia capable distribution bearer. The code may further be adapted to initiate a setting of at least one of the multiple mobile terminals to an emergency alert mode for a clearly human-recognizable perception of the delivered emergency service. Furthermore, the mobile terminals may be allocated to a group of mobile terminals and the code may be adapted to initiate the delivery of the emergency service to the group via the emergency multimedia capable distribution bearer.

A computer program operable at a processing unit of a network component for routing an emergency service associated with emergency information in a communication network may comprise code adapted to process the received the emergency service received via an emergency multimedia capable distribution bearer being associated with an emergency priority indicator indicating a higher priority for the emergency multimedia capable distribution bearer compared to further communication being not associated with the emergency priority indicator, to analyze the emergency priority indicator and, as a result of the analysis, to perform a prioritization of the emergency service, and to initiate at a transmission unit a sending of the emergency service via the emergency multimedia capable distribution bearer according to the prioritization.

A computer program operable at a processing unit of a mobile terminal comprises code adapted to process a received emergency service associated with emergency information via an emergency multimedia capable distribution bearer being indicated by an emergency priority indicator of being of a higher priority compared to further communication being not associated with the emergency priority indicator, to process received information for a setting of an output unit to an emergency alert mode for a clearly human-recognizable perception of the emergency service, to set the output unit to the emergency alert mode according to the received setting information and to process the received emergency service to be output by the output unit according to the emergency alert mode.

In the following, detailed embodiments of the present invention shall be described in order to give the skilled person a full and complete understanding. However, these embodiments are illustrative and not intended to be limiting.

DETAILED DESCRIPTION OF THE INVENTION

In case of an emergency event like an environmental disaster, an industrial catastrophe, or a terrorist attack, it is the aim to warn people and to inform them with appropriate instructions like escape instructions or addresses to turn to in case people are affected by the emergency event.

Figure 1:
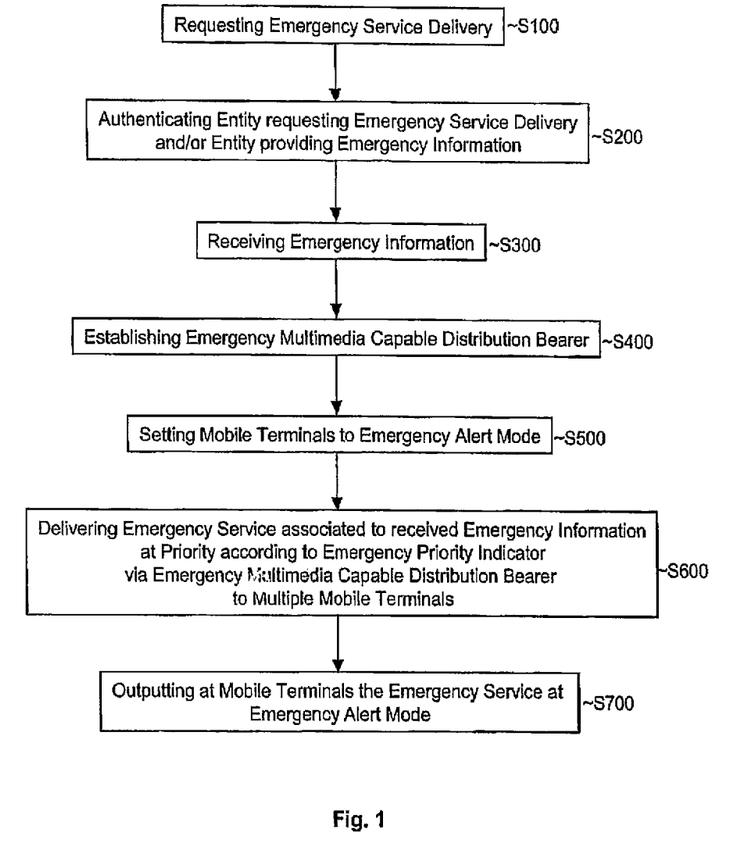
FIG. 1 shows a flow-chart of process steps according to an embodiment of the invention.
Figure 2:
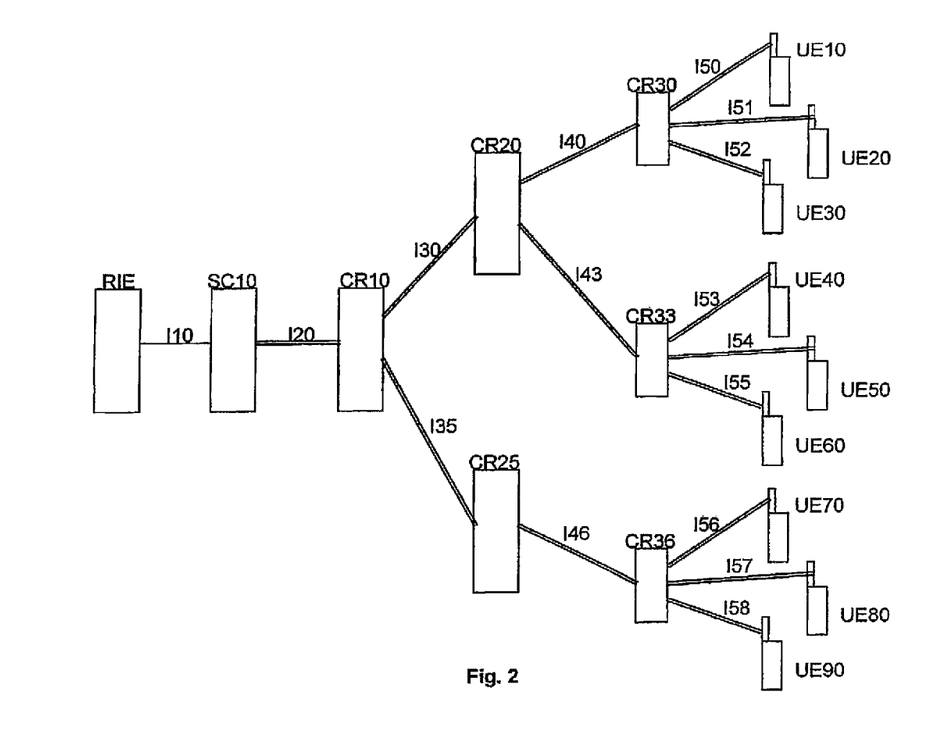
FIG. 2 shows a first embodiment of a system according to the invention.

Referring to FIGS. 1 and 2 to explain in more detail embodiments for the method and systems. Typically, the method may start according to step S100 with a request for a delivery of an emergency service to multiple mobile terminals to inform the mobile terminals about an emergency event. The request can be received at the service center SC10 from an entity that requests emergency service delivery.

According to a further step S300, emergency information is received at the service center SC10. The entity requesting the emergency service delivery and the entity providing emergency information can be one combined entity RIE as depicted or can be separate entities.

Emergency information can comprise any information about nature, time, period, location, urgency, and/or severeness of an emergency event and/or instructions on how to behave and to escape from an emergency situation or area. The emergency information can be received virtually in any kind of data format at the service center SC10.

Further instructions may be received in conjunction with the request and/or the emergency information like timing, regional, group-specific, and/or network-specific instructions. Examples for timing instructions are instructions advising the service center SC10 when and how often the emergency service has to be delivered or if a periodical delivery is wanted, examples for regional instructions are instructions in which region(s) like town(s), state(s), or nation(s) the emergency service is to be delivered, examples for group-specific instructions are instructions to deliver the emergency service to specific groups like policemen, firemen, rescue brigades, etc, and examples for network-specific instructions may comprise instructions on the particularities of a prioritization to be performed for the delivery of the emergency service, e.g. whether further communications in the communication network being not associated with the priority indicator has to be stopped at all etc.

Requesting entity is typically a governmental instance or public authority but further instances like rescue brigades or policemen units are conceivable as well.

The identity of the requesting entity and/or of the emergency information providing entity is preferably verified by an authentication step S200 to prevent misuse of the emergency service delivery and to ensure that only authorized entities can initiate said service and provide the emergency information to be distributed.

The service center SC10 may be further adapted to carry out operations necessary to accomplish the authentication of a combined entity RIE or an authentication of separate requesting and emergency information providing entities. The service center SC10 may be configured to perform the necessary steps for the authentication(s) by itself and/or may use an external authentication service. Typically, the entity requesting the emergency service delivery and the entity providing emergency information are identical such that a common authentication is possible, however, situations and implementation are conceivable wherein these entities are separate and thus have to be authenticated individually to prevent misuse.

For authentication and/or reception of the request and/or the emergency information, the service center SC10 may be accessed via a dedicated management interface like an O&M interface of a mobile network operator like a GSM or UMTS network operator.

Authentication may be accomplished by verifying an identity or signature of the entity that is to be authenticated, e.g. using a username/password mechanism. An implicit authentication is possible when the aforementioned management interface is under control of an authorized authority like a legally mandated instance similar to Lawful Interception Interfaces such that requests and/or emergency information received via such a controlled interface trigger the further processes for the delivery of the emergency service via an emergency multimedia capable distribution bearer to the multiple mobile terminals. Combinations of authentications methods are possible for increased security.

The method may be accelerated if the request and/or the emergency information are associated with a specific emergency indicator like a specific emergency flag that tells the service center SC10 that the incoming request and received emergency information and optionally instructions are associated with an emergency event and that an emergency service via an emergency multimedia capable distribution bearer is to be delivered immediately. Thus recognition of such received emergency indicator can trigger in an automatic fashion the service center SC10 to immediately initiate the establishing of the emergency multimedia capable distribution bearer. To prevent for misuse, aforementioned authentication procedures can be employed. Furthermore, the emergency indicator can be configured that it is not visible in the communication between the requesting and/or emergency providing entity and the service center SC10. Furthermore, the request and/or the emergency information are preferably encrypted and associated with a signature of the respective sending entity to provide for secrecy and integrity.

According to step S400, the service center SC10 initiates the establishing of an emergency multimedia capable distribution bearer to the mobile terminals UE10-90 to which the emergency service is to be delivered. The emergency multimedia capable distribution bearer may be established by the service center SC10 or the service center SC10 may request a further network component of the communication network to establish said emergency multimedia capable distribution bearer to the multiple mobile terminals UE10-90. Preferably, the service center SC10 is configured to recognize the one or more instructions that can be received in conjunction with the request and/or the emergency information and to initiate the establishing of the emergency multimedia capable distribution bearer according to those instructions.

According to the present example of FIG. 2, the established emergency multimedia capable distribution bearer extends from the service center SC10 via network components CR10-CR36 to the mobile terminals UE10-90 and is shown as double line in FIG. 2.

The emergency multimedia capable distribution bearer is associated with an emergency priority indicator indicating a higher priority compared to communication that is not associated with such an emergency priority indicator. A group of emergency priority indicators may exist from which an emergency priority indicator can be selected for association to the emergency multimedia capable distribution bearer to express finer granularity in prioritization like a highest priority for an emergency service to be delivered on behalf of a governmental instance and a lower priority for a non-governmental but a further emergency service delivery authorized instance. The service center SC10 may be configured to select and associate the selected emergency priority indicator to the emergency multimedia capable distribution bearer that is to be established.

The emergency service that is to be delivered is associated with the received emergency information, meaning the emergency service can be modified or unmodified in content, scope and/or format in relation to the received emergency information. For immediate delivery to the mobile terminals, the emergency service and the received emergency information may be associated in an unmodified manner like a received speech of the nation's president about the emergency event or a received video with multimedia rescue instructions may be delivered as emergency service immediately and unmodified. Emergency information may be received from many emergency content providers and may be associated into one emergency service such that the emergency service and the emergency information are associated in a modified manner. A further example for modification is an automatic codec change of the received emergency information to a codec that matches to the capabilities of the emergency multimedia capable distribution bearer. Owing to the multimedia distribution capabilities of the emergency multimedia capable distribution bearer, the emergency service may contain information in any kind of multimedia format like an immediate warning video with a brief explanation of the emergency event followed by an animated map illustrating possibilities for escaping from the emergency area by animated voice and graphics supplemented by a written and possibly clickable list of addresses to turn to for requesting further information. An emergency service may be conveyed via the emergency multimedia capable distribution bearer e.g. in form of one or more (Multimedia Messaging Service) MMS messages or streaming sessions.

After the establishing of the emergency multimedia capable distribution bearer, the emergency service is delivered via the emergency multimedia capable distribution bearer to the multiple mobile terminals UE10-90 according to step S600. The emergency service is delivered according to the priority indicated by the emergency priority indicator. To accomplish fast and reliable delivery, preferably all network components CR20-C36 are configured to recognize the emergency priority indicator and to perform adequate measures for prioritization. This may apply also to the service center SC10.

Effective prioritization measures are giving highest available resources to the communication associated with the emergency multimedia capable distribution bearer and lowest resources to further communication that is not associated with an emergency priority indicator. By doing so, the emergency service can be delivered to a large number of mobile terminals in very short time and network congestion by further communication can be avoided.

Examples for prioritization measures are interrupting, stopping, and/or decreasing a transmission power and/or a processing power associated with further communication on components SC10, CR10, CR20, CR25, CR30, CR33, CR36. Alternatively or preferably in addition, transmission power and/or processing power of said components associated with the emergency service delivery via the emergency multimedia capable distribution bearer are activated and/or increased. Preferably, messages associated with the emergency multimedia capable distribution bearer nearer set-up and the emergency service delivery are scheduled at earliest time compared to further communication. Thus, prioritization can comprise all kind of transmission power, processing power, and/or scheduling adaptations for faster, more reliable, and more secure emergency service delivery. An example for prioritization of processing power is to decrease the computational processing power like a Central Processing Unit (CPU) processing time, amount of processor allocation, and/or storage capacity for the processing of any kind of non-emergency related messages being not associated with any kind of priority indicator and increasing computational processing power like a CPU processing time, amount of processor allocation, and/or storage capacity for the processing of messages associated with the emergency service delivery via the emergency multimedia capable distribution bearer.

To prevent misuse of the emergency multimedia capable distribution bearer by spammers or other unauthorized users, a signature of the service center SC10 and/or any other suitable authority may be applied to the emergency service and/or to one or more messages that are required to establish the emergency multimedia capable distribution bearer verifyable by one or more of the network components CR10, CR20, CR25, CR30, CR33, CR36 and/or the mobile terminals UE10-90 to provide for the integrity of the emergency service. Encrypting and/or hashing are further possible security measures.

In order to avoid that a user of any of the mobile terminals UE10-90—although being capable of receiving the emergency service—miss the emergency service because the mobile terminal is in stand-by mode or muted or otherwise set to a mode of reduced user perception, preferably all of the multiple mobile terminals UE10-90 are set in a step S500 to an emergency alert mode for a clearly human-recognizable perception of the delivered emergency service, preferably before the emergency service delivery via the emergency multimedia capable distribution bearer starts.

The setting S500 to the emergency alert mode can be achieved in many ways and the set emergency alert mode settings shall prevail at least temporarily for the time of the emergency service output. According to a first example, the emergency alert mode settings may already be stored at the mobile terminals, e.g. burned in as a separate setting profile. An emergency alert mode activation indicator can be sent in conjunction with the establishing of the emergency multimedia capable distribution bearer or by accompanying the emergency service delivery. A mobile terminal, when recognizing the received emergency mode activation indicator, is triggered to change its current settings to the emergency alert mode settings and to output the emergency service according to these changed settings.

According to a second example, the emergency alert mode settings can be received at the mobile terminal in conjunction with the establishing of the emergency multimedia capable distribution bearer or the emergency service delivery. Thus, emergency alert mode settings may be configured via "Over-the Air" configuration procedure like it is possible to configure settings for MMS clients, email accounts, and Wireless Application Protocol (WAP) profiles. A mobile terminal, when receiving these new settings, is forced to change to the emergency alert mode setting and to output the received emergency service according to these new settings.

Generally, it is of advantage that the setting to the emergency alert mode occurs at the earliest possible point in time, e.g. within the framework of the establishing of the emergency multimedia capable distribution bearer or even before, such that the emergency service can be immediately output at the emergency alert mode for a clearly human-recognizable perception by a user that is to be informed about the emergency event so that the danger that user miss the emergency service is minimized. If the change to the emergency alert mode settings occur later, e.g. within the delivery of the emergency service, the user may miss first parts of the emergency service or the output may be delayed, both unwanted in emergency events.

Examples for emergency alert mode settings are an un-muting of a loudspeaker, to set a loudspeaker to a certain noticeable level (e.g. at highest possible output level), to activate a special alert ring tone, to activate vibrating, to activate a special alert optical signal like a blinking of the display or keypad, to deactivate, stop, or interrupt ongoing operations or communications at the mobile terminal, to set the mobile terminal to a reception mode for enabling the mobile terminal to receive the emergency service via the emergency multimedia capable distribution bearer (e.g. by setting one or more currently inactivated reception capabilities to a reception active mode like for an automatic CBS reception capability activation in case CBS reception is inactive on a mobile terminal), to auto-accept incoming emergency services identifiable based on an emergency priority indicator, and combinations thereof. The initiation and/or the completion of the setting of the emergency alert mode may be announced by the mobile terminal in a clearly recognizable way, e.g. in form of an emergency announcement for informing the user of the mobile terminal about the setting change for an up-coming output of an emergency service, thus further increasing user attention to the up-coming emergency service.

The setting of a mobile terminal to the emergency alert mode is thus preferably network controlled to prevent misuse. Consequently, it can be of advantage from a security perspective to associate the emergency priority indicator with the setting to the emergency alert mode and an initiation of the establishing of the emergency multimedia capable distribution bearer may cause an initiation of the setting to the emergency alert mode or vice versa. Thus, the service center SC10 when being requested to initiate the establishing of the emergency multimedia capable distribution bearer may also initiate the setting to the emergency alert mode by e.g. sending the emergency alert mode activation instructions and/or emergency alert mode activation indicator to the mobile terminals and/or to request at a separate network component like a profile providing node to perform the sending of said instructions and/or said indicator to the mobile terminals.

The emergency priority indicator and the emergency alert mode activation indicator can be the same indicator that effects both the prioritization of the delivery of emergency service at the respective network components and the setting to the emergency alert mode to output the emergency service in clearly perceptual manner. Alternatively, the emergency priority indicator and the emergency alert mode activation indicator can be two separate indicators serving for prioritization and emergency alert mode setting, respectively.

The emergency priority indicator and the corresponding prioritization processes, the emergency alert mode settings and the setting process itself are preferably standardized in order to have the same behavior in all kind of mobile terminals, in all kind of operator networks, and in all kind of countries.

According to step S600, the emergency service is delivered via the established emergency multimedia capable distribution bearer to the multiple mobile terminals UE10-90, where the received emergency service can be output at emergency alert mode to the respective users according to step S700.

In case the emergency event impacts a specific region, this region may be indicated to the service center SC10, e.g. via aforementioned regional instructions. The service center SC10 may initiate the establishing of the emergency multimedia capable distribution bearer to only those mobile terminals that are located within said region. Referring to FIG. 2, the region may be covered completely by the coverage of CR30 and mobile terminals UE10-30 shall be informed. In this case the emergency multimedia capable distribution bearer may extend from the service center SC10 via network components CR10, CR20, and CR30 to the mobile terminals UE10-30 via connections I20, I30, I40, I50-52. Correspondingly, no emergency multimedia capable distribution bearer to further network components CR25, CR33, CR36 and mobile terminals UE40-90 via further connections I35, I43, I46, I53-58 has to be established for that particular regional-specific emergency service delivery.

Figure 3:
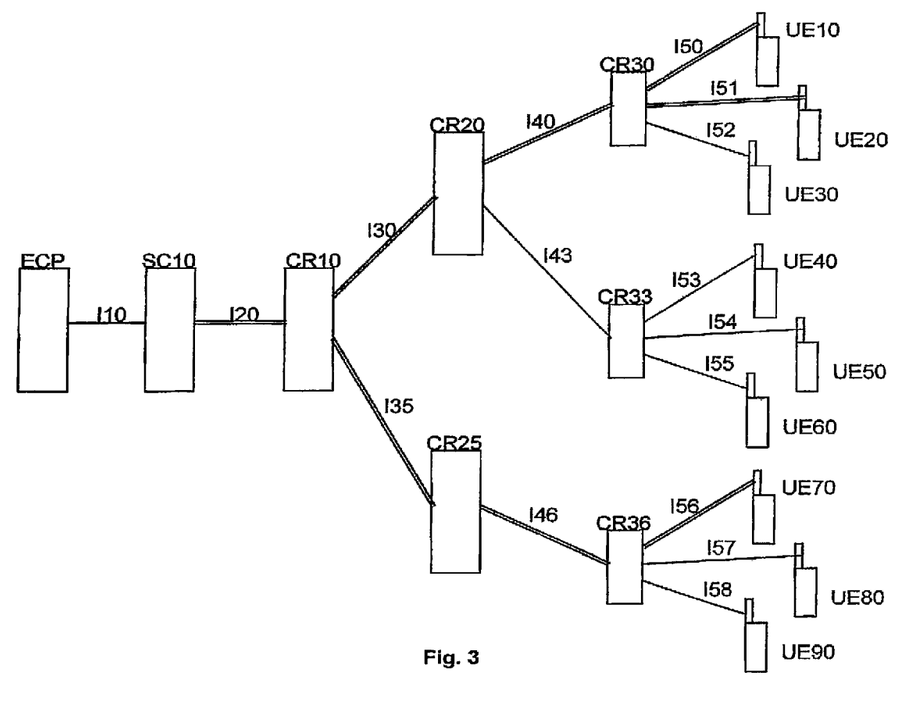
FIG. 3 shows a second embodiment of a system according to the invention.

In case the emergency service shall be delivered only to a specific group, e.g. a group of policemen, the service center SC10 may make use of a specific emergency group for providing the emergency service to the mobile terminals that belong to said group. In order to form such a group, the service center may allocate identities like MSISDN numbers associated with certain mobile terminals or users thereof to the group. The identities may be stored at least temporarily e.g. In a group-specific register of a database. When a request for informing a specific group is received at the service center SC10, the service center SC10 may retrieve the identities of said specific emergency group to initiate the establishing of the emergency multimedia capable distribution bearer (shown as doubled line in FIG. 3) to those ones of the mobile terminals that belong to the specific emergency group, i.e. mobile terminals UE10, UE20, UE70 according to the present example. One or more groups may be pre-configured and stored in a database. Alternatively or in addition, identities of a group may be provided to the service center SC10 in conjunction with the emergency information and/or the request for emergency service delivery as group-specific instructions.

More than one established emergency multimedia capable distribution bearer may exist in parallel in a communication network initiated by the same or separate service centers, e.g. to serve for emergency service deliveries to different groups in parallel. An emergency priority leveling scheme can be of advantage to adapt resources like transmission power and/or processing power and/or scheduling order of the respective components of a communication network to the respective emergency priority level of the respective one of established emergency multimedia capable distribution bearers and thus to perform a prioritization according to the level of the respective emergency priority indicator, i.e. to allocate more resources to a higher level and less resources to a lower level and lowest available resources to further communication being not associated with any emergency priority indicator. Emergency service deliveries via emergency multimedia capable distribution bearers being associated with emergency priority indicators of the same level may not be prioritized against each other.

The invention can be preferably implemented in a system providing Multimedia Broadcast/Multicast Service (MBMS) functionality. MBMS is currently standardized in 3$^{rd}$ Generation Partnership Project (3GPP) Technical Specifications (TS) 22.146 version (V) 6.6.0 (2004-09), 3GPP TS 22.246 V 6.2.0 (2004-09), and TS 23.246 V 6.4.0 (2004-09) or in 3GPP2 for CDMA 2000 systems and the emergency service may be delivered via an emergency multimedia capable distribution bearer by broadcasting it to any mobile terminal in any or a specific region or via multicasting it to an emergency multicast group of mobile terminals in any or a specific region. Thus, MBMS provides a very flexible implementation variant to inform multiple mobile terminals about an emergency event as it allows delivering emergency services to all mobile terminals attachable to such an MBMS system or to delivery to a part of the mobile terminals according to regional criteria or emergency multicast grouping.

Such a MBMS system typically comprises one or more Broadcast/Multicast Service Centers (BM-SCs), one or more Gateway GPRS Support Nodes (GGSNs), one or more Serving GPRS Support Nodes (SGSNs), and one or more Radio Network Controllers (RNCs) and/or one or more Base Station Controllers (BSCs) and is typically a part of a General Packet Radio System (GPRS) or Universal Mobile Telecommunication System (UMTS). A BM-SC may be represented by a service center SC10, a GGSN by a network component CR10, a SGSN by a network component CR20 or CR25, and a RNC/BNC by a network component CR30, CR33, or CR36 following the terminology according to FIGS. 2 and 3. Mobile terminals UE10-90 may be mobile phones or laptop computers equipped with wireless transceivers capable of receiving communication via a wireless network like GPRS or UMTS or Wireless Local Area Network (WLAN).

According to a first example, an emergency Quality of Service (QoS) class can be used to indicate the priority associated with the emergency multimedia capable distribution bearer. The advantage of a specific emergency QoS class as emergency priority indicator is that it is implementation-friendly and can be based on QoS schemes of MBMS and many other communication network set-ups.

When receiving the request for emergency service delivery and the emergency information, the BM-SC as an example for the service center SC10, is adapted to allocate the emergency QoS class to the emergency multimedia capable distribution bearer that is to be established. If a multiple level prioritization scheme is used, the BM-SC may further be configured to select a corresponding QoS class level e.g. according to the severeness of the emergency event or the identity of the requesting entity or according to received instructions.

Network components like GGSN, SGSN, and RNC/BNCs along the MBMS distribution tree are configured to recognize the emergency QoS class associated to the emergency multimedia capable distribution bearer and to prioritize the delivery of the emergency service to the mobile terminals accordingly.

According to the current MBMS standards, an associated QoS class is not recognizable by a mobile terminal, i.e. the associated emergency QoS class cannot be used as emergency alert mode activation indicator unless corresponding standards and/or mobile terminals are modified in a way that at least the associated emergency QoS class is recognized by the mobile terminals thus triggering the mobile terminals to set to an emergency alert mode.

Compliancy with existing standards is a preferable option and the emergency QoS class concept can be enhanced by using a separate emergency alert mode activation indicator that is recognizable by the mobile terminal e.g. in form of a MBMS User Equipment (UE) context. Preferably, a Temporary Mobile Group Identity (TMGI) is used for that purpose as the BM-SC is responsible for allocating a TMGI per MBMS bearer service and the TMGI is recognized by a mobile terminal. A TMGI is composed of two parts, which is the globally unique MCC/MNC (PLMN ID) and a local MBMS bearer service identity that is unique within a PLMN. Thus, the BM-SC when triggered to inform mobile terminals about an emergency event may retrieve from a storage unit a predefined emergency TMGI that is unique within the operators network or preferably even unique in many/all kind of networks like a 911 emergency call number in upward direction from a phone. Mobile terminals, when receiving this specific emergency TMGI, are thus adapted to change their current settings to the emergency alert mode settings. A TMGI is usually distributed to the mobile terminals for MBMS notification purpose via a service announcement message, thus at a very early stage of the MBMS distribution process at both the broadcast and the multicast mode of MBMS. This early distribution allows for a settings change before the emergency service is delivered making the TMGI very attractive as emergency alert mode activation indicator.

According to a second example, the emergency TMGI may be used both as emergency priority indicator and as emergency alert mode activation indicator. As mentioned before, using emergency QoS class is also an option for an indicator serving both purposes.

Figure 4:
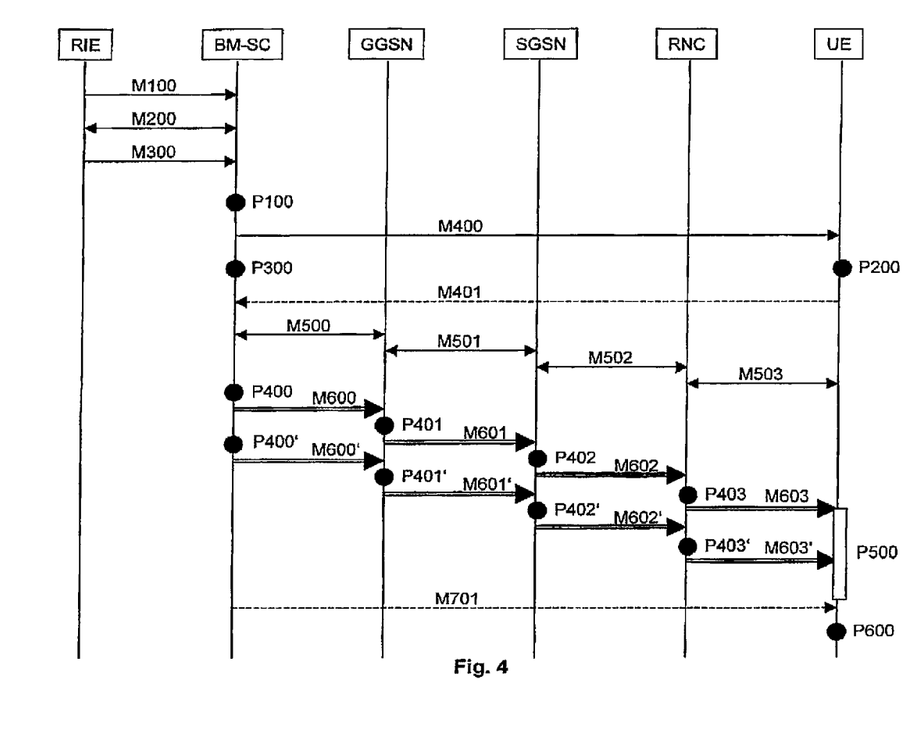
FIG. 4 shows messages and processes for implementing the invention.

Referring now to FIG. 4, which depicts processes and messages to carry out the method in an MBMS-capable system in broadcast or multicast mode. For illustration purpose, the involved devices have been limited, however, real systems usually comprise more than one of the respective depicted device.

First, the BM-SC receives via message M100 a request for emergency service delivery to multiple mobile phones from an emergency service delivery requesting and emergency information providing entity RIE. The entity RIE is authenticated via communication M200 and can provide via one or more messages M300 emergency information and/or receiving timing, regional, group-specific and/or network-specific instructions to the BM-SC. For security reasons preferably a secure communication between the entity RIE and the BM-SC is used, e.g. via a Secure Socket Layer (SSL) connection.

The BM-SC recognizing that an emergency service is to be delivered retrieves according to process P100 from its storage an emergency TMGI that is subsequently sent via a service announcement message M400 to the mobile terminal UE. The mobile terminal UE recognizing this emergency TMGI as emergency alert mode activation indicator retrieves emergency alert mode settings from its storage unit and overwrites the current settings with the emergency alert mode settings. Consequently, the mobile terminal UE is now capable to output any received emergency service in clearly recognizable way. As part of the settings change, an announcement message may be played out to the user of the mobile terminal UE to alert him about the up-coming emergency service delivery.

Typically, the mobile terminal UE answers with a reply message M401 to the service announcement messages M400. As usually a large number of mobile terminals are informed, the number of reply messages in a system can be rather large and this reply message M401 is preferably omitted or suppressed e.g. according to prioritization to avoid network congestion and unnecessary load of the network nodes like the RNC, SGSN, GGSN, or BM-SC.

Preferably the mobile terminals are adapted to omit any kind of reply messages in emergency situations and the nodes are preferably adapted to proceed without waiting for these reply messages. Alternatively, reply messages may be collected at the respective branches of the reverse distribution tree and may be compiled by the respective nodes into aggregated reports to reduce the number of messages and thus node and network load. The latter provides the advantage that the BM-SC and/or entity RIE may be informed about those mobile terminals that received the emergency service.

According to process P300, the BM-SC furthermore selects an emergency QoS class and allocates this emergency QoS class to the emergency multimedia capable distribution bearer that is to be established. The establishing of the emergency multimedia capable distribution bearer is indicated by messages M500-M503. After the establishing of the emergency multimedia capable distribution bearer, the emergency service is delivered via the emergency multimedia capable distribution bearer comprising indicated messages M600-M603, M603-M603' and indicated prioritization processes P400-P403, P400'-P403' performed at the respective components BM-SC, GGSN, SGSN, and RNC along the MBMS distribution path. The mobile terminal UE receiving messages M603 and M603' outputs the received emergency service at the emergency alert mode settings in a clearly recognizable way according to process P500.

The emergency alert mode settings may be deactivated as indicated by process P600 by receiving a deactivation message M701. Alternatively, a return to the previous or to default settings may occur automatically after a certain time has passed without receiving any further emergency service delivery related messages. As an example, a life-time of emergency alert mode settings can be stated in the emergency alert mode activation instructions as well or a life-time can be part of the emergency alert mode settings that are stored on the mobile terminal UE. Expiry of the life-time then can trigger the mobile terminal UE to deactivate the emergency alert mode and to e.g. return to the default settings which consume e.g. less battery power.

MBMS multicast mode furthermore requires the usage of a multicast group. This multicast group may be specified in advance, e.g. during user subscription to an operator contract or by the entity RIE, such that no messages and processes for subscription, joining, and/or leaving the multicast group are needed for an emergency service delivery via a MBMS multicast emergency multimedia capable distribution bearer as these messages cause network load and consume time and are thus to be avoided. Respective devices in a MBMS system have to be adapted to comply with the requirements that come along with the omitted messages as described before.

Using MBMS for the emergency service delivery to mobile terminals improves significantly existing emergency alert systems. Any kind of received emergency information in any kind of format can be immediately delivered to the recipient mobile terminals in a multimedia format without modification at the BM-SC thus saving processing time for adaptation of the received information to a text message and overcoming its limitation regarding a user presentation. Furthermore, the MBMS emergency multimedia capable distribution bearer is preferably prioritized in all instances of the delivery chain thus avoiding network congestion and ensuring immediate service delivery and output to the user in a clearly recognizable way. Beside that, MBMS uses network resources in a very efficient way as the emergency service is usually replicated only at network branching points of the emergency delivery path from the service center towards the mobile terminals. Accordingly, immediate and cost efficient emergency service delivery to the multiple mobile terminals is achieved such that the probability that any one of the mobile terminals does not receive the emergency service at all or receive it long time after an emergency event occurred is minimized. Furthermore, MBMS allows to address specific groups of mobile terminals for a distribution of emergency services adapted to the needs or requirements of a specific group thus increasing flexibility and availability adapted to groups.

Figure 5A:
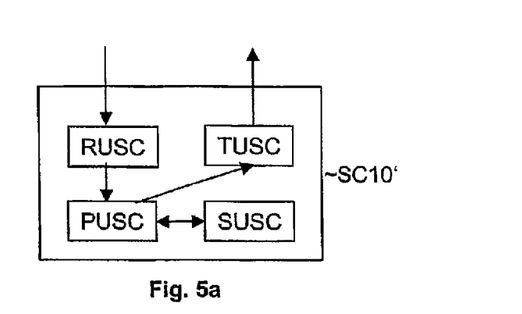
FIG. 5a shows an embodiment for a service center according to the invention.
Figure 5B:
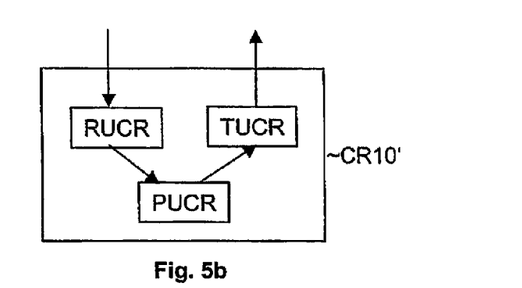
FIG. 5b shows an embodiment for a network component according to the invention.
Figure 5C:
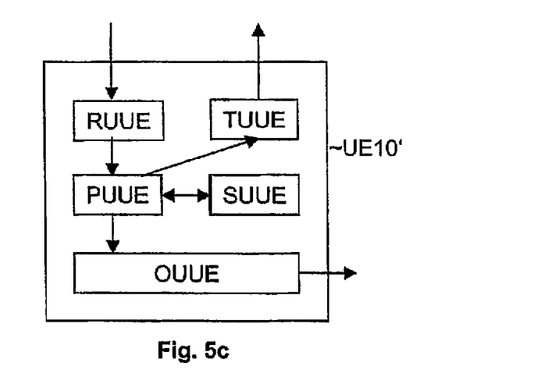
FIG. 5c shows an embodiment for a mobile terminal according to the invention.

Referring now to FIG. 5a-c), embodiments for a service center SC10', a network component CR10', and a mobile terminal UE10' are explained in the following. The service center SC10', the network component CR10', and the mobile terminal UE10' may be adapted to perform any of the respective steps of the method according to the invention.

The service center SC10', e.g. a BM-SC, may comprise a receiving unit RUSC, a processing unit PUSC, and a transmission unit TUSC. The receiving unit RUSC is adapted to receive emergency information associated with the emergency event. The processing unit PUSC is adapted to initiate an establishing of an emergency multimedia capable distribution bearer for a delivery of an emergency service associated with the received emergency information. The emergency multimedia capable distribution bearer is associated e.g. by the processing unit PUSC with an emergency priority indicator indicating higher priority for the emergency multimedia capable distribution bearer compared to further communication being not associated with the emergency priority indicator. The transmission unit TUSC is adapted to send the emergency service via the emergency multimedia capable distribution bearer to the multiple mobile terminals like UE10-90 for informing the multiple mobile terminals of the emergency event.

The processing unit PUSC can be further adapted to associate the emergency priority indicator to the emergency multimedia capable distribution bearer. Alternatively or in addition, the processing unit PUSC can be adapted to select the emergency priority indicator from a group of emergency priority indicators each indicating an emergency priority level and to associate the selected emergency priority indicator as the emergency priority indicator with the emergency multimedia capable distribution bearer.

The service center SC10' can further comprise a storage unit SUSC from which an emergency priority indicator can be obtained for association to the emergency bearer. The storage unit SUSC may be further adapted to store, at least temporary, received emergency information or group-specific information.

Furthermore, the processing unit PUSC can be adapted to perform an authentication of an entity from which the emergency information is received and/or an entity requesting the emergency service delivery like entity RIE.

The processing unit PUSC is preferably adapted to initiate a setting of at least one of the multiple mobile terminals to an emergency alert mode for a clearly human-recognizable perception of the delivered emergency service.

Furthermore, the mobile terminals can be allocated to a group of mobile terminals and the processing unit PUSC can be adapted to initiate the delivery of the emergency service to the group via the emergency multimedia capable distribution bearer.

Referring now to FIG. 5b) showing an embodiment for a network component CR10' for routing an emergency service associated with emergency Information in a communication network. The network component CR10' like an RNC or BSC comprises a receiving unit RUCR, a processing unit PUCR, and a transmission unit TUCR. The receiving unit RUCR is adapted to receive the emergency service via an emergency multimedia capable distribution bearer being associated with an emergency priority indicator indicating a higher priority for the emergency multimedia capable distribution bearer compared to further communication being not associated with the emergency priority indicator. The processing unit PUCR is adapted to analyze the emergency priority indicator and, as a result of the analysis, to perform a prioritization of the emergency service. The transmission unit TUCR is adapted to send the emergency service via the emergency multimedia capable distribution bearer according to the prioritization.

The processing unit PUCR can be further adapted to perform the prioritization comprising at least one process of a group of interrupting, stopping, and/or decreasing a transmission power of the transmission unit TUCR and/or a processing power of the processing unit PUCR associated with the further communication and/or activating and/or increasing a transmission power of the transmission unit TUCR and/or a processing power of the processing unit PUCR associated with the emergency service delivery via the emergency multimedia capable distribution bearer, and/or changing a scheduling of one or more messages associated with the emergency service delivery compared to a scheduling of one or more messages associated with the further communication such that the one or more messages associated with the emergency service delivery are processed by the processing unit PUCR and/or sent by the transmission unit TUCR at an earlier time compared to the one or more messages associated with the further communication.

An embodiment of a mobile terminal UE10' is depicted in FIG. 5c). The mobile terminal UE10' comprises at least a receiving unit RUUE, a processing unit PUUE, an output unit OUUE and typically also a transmission unit TUUE for sending messages like messages 401 or for attaching to the communication network. The receiving unit RUUE is adapted to receive an emergency service associated with emergency information via an emergency multimedia capable distribution bearer being indicated by an emergency priority indicator of being of a higher priority compared to further communication being not associated with the emergency priority indicator. The receiving unit RUUE is further adapted to receive information for a setting of the output unit OUUE to an emergency alert mode for a clearly human-recognizable perception of the emergency service. In addition, the processing unit PUUE is adapted to set the output unit OUUE to the emergency alert mode according to the received setting information and to process the received emergency service to be output by the output unit OUUE according to the emergency alert mode. The output unit OOUE is adapted to output the emergency service according to the emergency alert mode.

Furthermore, the received information for setting the output unit OUUE to the emergency alert mode can comprise an emergency alert mode activation indicator. The mobile terminal UE10' may further comprise a storage unit SUUE wherein one or more emergency alert mode settings are stored. The processing unit PUUE can be adapted to retrieve the one or more emergency alert mode settings as indicated by the emergency alert mode activation indicator from the storage unit SUUE and to set the output unit OUUE to the emergency alert mode according to the retrieved one or more emergency alert mode settings.

The received information for setting the output unit OUUE to the emergency alert mode may comprise one or more emergency alert mode settings and the processing unit PUUE can be adapted to set the output unit OUUE to the emergency alert mode according to the received one or more emergency alert mode settings.

The emergency priority indicator and the emergency alert mode activation indicator can be one indicator and the processing unit PUUE can be adapted to process the one indicator accordingly.

The invention claimed is:
1. A method for informing multiple mobile terminals of an emergency event, the method comprising the steps of receiving emergency information associated with the emergency event;

establishing an emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication being not associated with the emergency priority indicator, wherein the emergency priority indicator is an emergency Temporary Mobile Group Identity (TMGI) that is unique within a network serving the multiple mobile terminals; and in response to the establishing the emergency multimedia capable distribution bearer, delivering the emergency service via the emergency multimedia capable distribution bearer to the multiple mobile terminals.

2. The method according to claim 1, further comprising the step of authenticating an entity from which the emergency information is received and/or an entity requesting the emergency service delivery.

3. The method according to claim 1, further comprising the steps of selecting the emergency priority indicator from a group of emergency priority indicators each indicating an emergency priority level and associating the selected emergency priority indicator as the emergency priority indicator with the emergency multimedia capable distribution bearer.

4. The method according to claim 1, further comprising the steps of:

analyzing the emergency priority indicator by at least one component of a communication network for the delivering of the emergency service and, as a result of the analysis; and prioritizing the delivery of the emergency service via the emergency multimedia capable distribution bearer over the further communication being not associated with the emergency priority indicator.

5. The method according to claim 4, wherein the prioritization comprises at least one process from a group consisting of:

interrupting, stopping, and/or decreasing a transmission power and/or a processing power associated with the further communication;

activating and/or increasing a transmission power and/or a processing power associated with the emergency service delivery via the emergency multimedia capable distribution bearer; and changing a scheduling of one or more messages associated with the emergency service delivery compared to a scheduling of one or more messages associated with the further communication such that the one or more messages associated with the emergency service delivery are processed and/or sent at an earlier time compared to the one or more messages associated with the further communication.

6. The method according to claim 1, further comprising the step of setting of at least one of the multiple mobile terminals to an emergency alert mode for a clearly human-recognizable perception of the delivered emergency service.

7. The method according to claim 6, wherein an emergency alert mode activation indicator is sent to the at least one mobile terminal for an activation of the setting to the emergency alert mode.

8. The method according to claim 1, wherein an emergency alert mode setting instruction is sent to the at least one mobile terminal for instructing the at least one mobile terminal for the setting to the emergency alert mode.

9. The method according to claim 1, wherein the emergency priority indicator and the emergency alert mode activation indicator are one indicator.

10. The method according to claim 1, further comprising the step of allocating the multiple mobile terminals to a group of mobile terminals and to deliver the emergency service to the group via the emergency multimedia capable distribution bearer.

11. The method according to claim 1, wherein the emergency multimedia capable distribution bearer is a bearer of a Multimedia Broadcast/Multicast Service.

12. The method according to claim 1, further comprising:

establishing at least one additional emergency multimedia capable distribution bearer in parallel with the emergency multimedia capable distribution bearer to serve for emergency service deliveries to different groups in parallel.

13. The method according to claim 1, wherein the emergency TMGI is a predefined emergency TMGI that is unique within the network serving the multiple mobile terminals.

14. The method according to claim 1, wherein the emergency TMGI further comprises:

a globally-unique public land mobile network identifier (PLMN ID); and a local multimedia broadcast multicast service (MBMS) bearer service identity that is unique within a PLMN.

15. The method according to claim 1, wherein the emergency TMGI is used both as the emergency priority indicator and as an emergency alert mode activation indicator.

16. A service center suitable for informing multiple mobile terminals of an emergency event, the service center comprising:

a receiving unit, a processing unit, and a transmission unit, wherein the receiving unit is adapted to receive emergency information associated with the emergency event, the processing unit is adapted to initiate an establishing of an emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication being not associated with the emergency priority indicator, the emergency priority indicator is an emergency Temporary Mobile Group Identity (TMGI) that is unique with a network serving the multiple mobile terminals, the transmission unit is adapted to send the emergency service via the emergency multimedia capable distribution bearer to the multiple mobile terminals.

17. The service center according to claim 16, wherein the processing unit is adapted to associate the emergency priority indicator to the emergency multimedia capable distribution bearer.

18. The service center according to claim 16, wherein the processing unit (PUSC) is adapted to perform an authentication of an entity from which the emergency information is received and/or an entity requesting the emergency service delivery.

19. The service center according to claim 16, wherein the processing unit is adapted to select the emergency priority indicator from a group of emergency priority indicators each indicating an emergency priority level and to associate the selected emergency priority indicator as the emergency priority indicator with the emergency multimedia capable distribution bearer.

20. The service center according to claim 16, wherein the processing unit is adapted to initiate a setting of at least one of the multiple mobile terminals to an emergency alert mode for a clearly human-recognizable perception of the delivered emergency service.

21. The service center according to claim 16, wherein the mobile terminals are allocated to a group of mobile terminals and the processing unit is adapted to initiate the delivery of the emergency service to the group via the emergency multimedia capable distribution bearer.

22. A network component for routing an emergency service associated with emergency information in a coma communication network, the network component comprising:
   a receiving unit;
   a processing unit; and
   a transmission unit;
   wherein the receiving unit is adapted to receive the emergency service via an emergency multimedia capable distribution bearer being associated with an emergency priority indicator indicating a higher priority for the emergency multimedia capable distribution bearer compared to further communication being not associated with the emergency priority indicator, the emergency priority indicator is an emergency Temporary Mobile Group Identity (TMGI) that is unique within the communication network serving multiple mobile terminals, the processing unit is adapted to analyze the emergency priority indicator and, as a result of the analysis, to perform a prioritization of the emergency service, and, in response to establishing the emergency multimedia capable distribution bearer, the transmission unit is adapted to send the emergency service via the emergency multimedia capable distribution bearer according to the prioritization.

23. The network component according to claim 22, wherein the processing unit is adapted to perform the prioritization comprising at least one process from the group consisting of:
   interrupting, stopping, and/or decreasing a transmission power of the transmission unit and/or a processing power of the processing unit associated with the further communication;
   activating and/or increasing a transmission power of the transmission unit and/or a processing power of the processing unit associated with the emergency service delivery via the emergency multimedia capable distribution bearer; and
   changing a scheduling of one or more messages associated with the emergency service delivery compared to a scheduling of one or more messages associated with the further communication such that the one or more messages associated with the emergency service delivery are processed by the processing unit and/or sent by the transmission unit at an earlier time compared to the one or more messages associated with the further communication.

24. A system for informing multiple mobile terminals of an emergency event, the system comprising:
   a service center having a receiving unit, a processing unit, and a transmission unit, wherein the receiving unit is adapted to receive emergency information associated with the emergency event, the processing unit is adapted to initiate an establishing of emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication, being not associated with the emergency priority indicator, the emergency priority indicator is an emergency Temporary Mobile Group Identity (TMGI) that is unique within a network serving the multiple mobile terminals, and, in response to establishing the emergency multimedia capable distribution bearer, the transmission unit is adapted to send the emergency service via the emergency multimedia capable distribution bearer to the multiple mobile terminals;
   one or more network components having a receiving unit, a processing unit, and a transmission unit wherein the receiving unit is adapted to receive the emergency service via an emergency multimedia capable distribution bearer being associated with an emergency priority indicator indicating a higher priority for the emergency multimedia capable distribution bearer compared to further communication being not associated with the emergency priority indicator, the processing unit is adapted to analyze the emergency priority indicator and, as a result of the analysis, to perform a prioritization of the emergency service, and the transmission unit is adapted to send the emergency service via the emergency multimedia capable distribution bearer according to the prioritization; and
   multiple mobile terminals adapted to receive the emergency service via the emergency multimedia capable distribution bearer.

25. The system according to claims 24 wherein the multiple mobile terminals further comprise a receiving unit, a processing unit and an output unit wherein the receiving unit is adapted to receive an emergency service associated with emergency information via an emergency multimedia capable distribution bearer being indicated by an emergency priority indicator of being of a higher priority compared to further communication being not associated with the emergency priority indicator, to receive information for a setting of the output unit to an emergency alert mode for a clearly human-recognizable perception of the emergency service, the processing unit is adapted to set the output unit to the emergency alert mode according to the received information for setting and to process the received emergency service to be output by the output unit according to the emergency alert mode, and the output unit is adapted to output the emergency service according to the emergency alert mode.

26. A non-transitory computer readable storage medium storing a computer program executable by a computer processor and adapted to perform steps of, with respect to a service center:
   receiving emergency information associated with the emergency event;
   establishing an emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication being not associated with the emergency priority indicator, wherein
   the emergency priority indicator is an emergency Temporary Mobile Group Identity (TMGI) that is unique within a network serving multiple terminals; and in response to the establishing the emergency multimedia capable distribution bearer, delivering the emergency service via the emergency multimedia capable distribution bearer to the multiple mobile terminals.

27. A non-transitory computer readable storage medium storing a computer program executable by a computer processor and adapted to perform steps of, with respect to a network component:

receiving emergency information associated with the emergency event; establishing an emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication being not associated with the emergency priority indicator, wherein the emergency priority indicator is an emergency Temporary Mobile Group Identity (TMGI) that is unique within a network serving multiple terminals; and in response to the establishing the emergency multimedia capable distribution bearer, delivering the emergency service via the emergency multimedia capable distribution bearer to the multiple mobile terminals.

28. A non-transitory computer readable medium storing a computer program executable by a computer processor and adapted to perform steps of, with respect to a mobile terminal:

receiving emergency information associated with the emergency event; establishing an emergency multimedia capable distribution bearer for a delivery of an emergency service associated with the received emergency information, the emergency multimedia capable distribution bearer being associated with an emergency priority indicator indicating a higher priority for the emergency multimedia capable distribution bearer compared to further communication being not associated with the emergency priority indicator, wherein the emergency priority indicator is an emergency Temporary Mobile Group Identity (TMGI) that is unique within a network serving multiple terminals; and in response to the establishing the emergency multimedia capable distribution bearer, delivering the emergency service via the emergency multimedia capable distribution bearer to the multiple mobile terminals.

* * * * *